United States Patent [19]
Delp, II

[11] Patent Number: 5,865,877
[45] Date of Patent: *Feb. 2, 1999

[54] METHOD AND APPARATUS FOR SUPPLYING A PRESSURIZED DIVER'S BREATHING GAS FOR UNDERWATER DIVERS

[75] Inventor: William H. Delp, II, Lake Worth, Fla.

[73] Assignee: Undersea Breathing Systems, Inc., Lake Worth, Fla.

[*] Notice: This patent issued on a continued prosecution application filed under 37 CFR 1.53(d), and is subject to the twenty year patent term provisions of 35 U.S.C. 154(a)(2).

[21] Appl. No.: 822,140

[22] Filed: Mar. 17, 1997

Related U.S. Application Data

[63] Continuation-in-part of Ser. No. 518,020, Aug. 22, 1995, Pat. No. 5,611,845.

[51] Int. Cl.$^6$ .................................................. B01D 53/22
[52] U.S. Cl. .......................... 95/12; 95/17; 95/18; 95/54; 96/4; 96/8
[58] Field of Search .............................. 95/8, 12, 14, 23, 95/45, 47, 54, 17, 18; 96/4, 7, 8, 10; 55/270, 274

[56] References Cited

U.S. PATENT DOCUMENTS

| Re. 33,502 | 12/1990 | Gollan | 95/45 |
|---|---|---|---|
| 3,369,343 | 2/1968 | Robb | 96/4 X |
| 3,593,735 | 7/1971 | Reiher | 137/88 |

(List continued on next page.)

FOREIGN PATENT DOCUMENTS

| 57-144020 | 9/1982 | Japan | 95/54 |
|---|---|---|---|
| 1-264905 | 10/1989 | Japan | 96/4 |
| 3-109912 | 5/1991 | Japan | 95/8 |
| 3-242304 | 10/1991 | Japan | 96/4 |
| 3-242305 | 10/1991 | Japan | 96/4 |
| 3-247502 | 11/1991 | Japan | 96/4 |
| 4-5191 | 1/1992 | Japan | 96/8 |
| 4-122414 | 4/1992 | Japan | 95/52 |
| WO94/26394 | 11/1994 | WIPO | 95/45 |

OTHER PUBLICATIONS

Pp. 1 and 13 from Memorandum Opinion and Order, Civil Action No. 97 C 2014, U.S. District Court for the Northern District of Illinois, Eastern Division, decided Nov. 20, 1997.

Brochure titled "Nitrox Generation Systems Utilizing Patented Air Separation Membranes", Nitrox Technologies, Inc., Petaluma CA 94954, first page dated Mar. 14, 1997, subsequent pages dated Feb. 28, 1997, 5 pages (N00142–N00146).

Nitrox Tech. Inc. Installation Guide NTX Schematics, Sep. 1996, 17 pages (N00189–N00205).

(List continued on next page.)

Primary Examiner—Robert Spitzer
Attorney, Agent, or Firm—Evenson, McKeown, Edwards & Lenahan, PLLC

[57] ABSTRACT

A system that includes an equipment package for separating nitrogen from air to produce enhanced oxygen air for use by divers. The package is combined with a pressure storage tank for air that is coupled to the package. A pressure storage tank is provided for enhanced oxygen air. A fill station including a high pressure gauge and a high pressure oxygen sensor is provided to fill divers' tanks. A compressor receives the enhanced oxygen air from the package and delivers high or low pressure enhanced oxygen air to the pressure storage tank via a pressure filter. Valving is provided for selectively controlling the flow in the system.

37 Claims, 5 Drawing Sheets

U.S. PATENT DOCUMENTS

| | | | |
|---|---|---|---|
| 3,727,626 | 4/1973 | Kanwisher et al. | 137/88 |
| 3,777,809 | 12/1973 | Milde, Jr. | 55/16 |
| 3,799,218 | 3/1974 | Douglass | 141/18 |
| 3,930,813 | 1/1976 | Gessner | 95/54 |
| 3,976,451 | 8/1976 | Blackmer et al. | 96/7 |
| 4,022,234 | 5/1977 | Dobritz | 1376/7 |
| 4,023,587 | 5/1977 | Dobritz | 137/88 |
| 4,174,955 | 11/1979 | Blackmer et al. | 96/7 |
| 4,198,213 | 4/1980 | Mannatt | 55/16 |
| 4,230,463 | 10/1980 | Henis et al. | 55/16 |
| 4,421,529 | 12/1983 | Revak et al. | 95/54 |
| 4,537,606 | 8/1985 | Itoh et al. | 96/7 |
| 4,560,394 | 12/1985 | McDonald et al. | 95/54 |
| 4,632,677 | 12/1986 | Blackmer | 55/158 |
| 4,681,602 | 7/1987 | Glenn et al. | 95/47 |
| 4,695,295 | 9/1987 | Dorman et al. | 55/16 |
| 4,758,251 | 7/1988 | Swedo et al. | 55/16 |
| 4,789,388 | 12/1988 | Nishibata et al. | 96/7 |
| 4,834,779 | 5/1989 | Paganessi et al. | 55/16 |
| 4,849,174 | 7/1989 | Brandt et al. | 422/62 |
| 4,860,803 | 8/1989 | Wells | 141/9 |
| 4,894,068 | 1/1990 | Rice | 55/16 |
| 4,950,315 | 8/1990 | Gollan | 96/7 |
| 5,053,058 | 10/1991 | Mitariten | 95/8 |
| 5,061,377 | 10/1991 | Lee et al. | 210/752 |
| 5,069,692 | 12/1991 | Grennan et al. | 96/4 |
| 5,120,329 | 6/1992 | Sauer et al. | 55/16 |
| 5,125,937 | 6/1992 | Sadkowski et al. | 55/158 |
| 5,129,921 | 7/1992 | Baker et al. | 95/45 |
| 5,129,924 | 7/1992 | Schultz | 95/47 X |
| 5,157,957 | 10/1992 | Mettes et al. | 73/1 G |
| 5,158,584 | 10/1992 | Tamura | 95/54 X |
| 5,169,415 | 12/1992 | Roettger et al. | 55/68 |
| 5,226,931 | 7/1993 | Combier | 55/16 |
| 5,239,856 | 8/1993 | Mettes et al. | 73/1 G |
| 5,266,101 | 11/1993 | Barbe et al. | 95/23 |
| 5,284,506 | 2/1994 | Barbe | 95/23 |
| 5,302,258 | 4/1994 | Renlund et al. | 204/129 |
| 5,306,331 | 4/1994 | Auvil et al. | 95/45 X |
| 5,324,478 | 6/1994 | Mermoud et al. | 422/62 |
| 5,332,547 | 7/1994 | Olson et al. | 422/3 |
| 5,355,781 | 10/1994 | Liston et al. | 99/476 |
| 5,388,413 | 2/1995 | Major et al. | 95/54 X |
| 5,427,160 | 6/1995 | Carson et al. | 141/4 |
| 5,437,837 | 8/1995 | Olson et al. | 422/3 |
| 5,439,507 | 8/1995 | Barbe et al. | 95/23 |
| 5,470,379 | 11/1995 | Garrett | 95/12 X |
| 5,507,855 | 4/1996 | Barry | 95/12 |
| 5,611,845 | 3/1997 | Delp, II | 96/4 |
| 5,649,995 | 7/1997 | Gast, Jr. | 95/54 X |
| 5,700,310 | 12/1997 | Bowman et al. | 95/54 X |

OTHER PUBLICATIONS

Pamphlet titled "Nitrox (7CFM) System TURN KEY", Undersea Breathing Systems, Inc., Lake Worth, Fla., n.d., 2 pages.

Pamphlet titled "Nitrox (16CFM) System TURN KEY", Undersea Breathing Systems, Inc., Lake Worth, Fla., n.d., 2 pages.

Pamphlet including (1) first page titled "UBS Nitrox Membrane System PM Series . Tech Specs" and (2) second page titled UBS Nitrox Membrane System General Product Specifications, Undersea Breathing Systems, Inc., Lake Worth, Fla., n.d.

Pamphlet including (1) first page titled "Equipment Leasing—The Cost–Effective Choice", (2) second page titled Lease Agreement and (3) third page titled Credit Application, Undersea Breathing Systems, Inc., Lake Worth, Fla., n.d.

M. Hewtink, Manval dated Mar. 2, 1997 titled "Swba Nitrox Pro", pp. 1–10.

Copy of letter dated Jan. 6, 1997 from Gregory L. Malcolm, Market Manager, PERMEA, to William H. Delp.

Transcript (pp. 1–156) and Index (pp. 1–14) of Deposition of Gregory L. Malcolm taken in connection with Civil Action No. 97–C–2014 on Jun. 2, 1997, together with Deposition Exhibit Nos. 1–5 and 7–10.

R.W. Hamilton, "Evaluating Enriched Air (Nitrox) Diving Technology", Scuba Diving Resource Group, Boulder, Colorado, Jan. 31, 1992, pp. 1–20.

D. Rutkowski, "Introduction to NITROX", Hyperbarics International, Inc., Key Largo, Florida, 1992, pp. 1–50.

"Gas Separation Technology and Undersea Habitat Mixed Gas Diving," J. Morgan Wells et al., MTS 94 Conference Proceedings, Wash., D.C., Sep. 7–9, 1994, pp. 496–502.

"Applications of Gas Separation Technology in the Preparation of Diver's Breathing Gases and Hyperbaric Atmospheres", by J. Morgan Wells et al., NOAA Experimental Diving Unit Report 93–04, Sep. 1993.

Michael Garms, United Kingdom patent application No. 9315694.1, filed Aug. 4, 1993.

Pamphlet titled "PRISM Alpha Membrane Separators—For Low–Cost On–Site Nitrogen", Permea Inc./A. Monsanto Company, 1987, pp. 1–8.

Copies of pp. 1, 56–57 and 63–64 of Memorandum Opinion and Order, Civil Action No. 97C2014, Nov. 20, 1997.

"Air Separations Via Membranes—Beyond Nitrogen", Earl R. Beaver et al., The 1990 Membrane Technology/Planning Conference, Newton, MA, Oct. 15–17, 1990.

"Application Driven Membrane Separator Designs", Donald J. Stookey et al., American Institute of Chemical Engineers, Symposium for Membrane Separation for Gas Processing, Houston, TX, Apr. 9, 1991.

"Nitrox Machines", Pierce Hoover, Sport Diver Magazine, p. 74, May–Jun. 1995.

Pp. 1, 3 and 13, IANTD Journal, vol. 95–2, May–Jul. 1995, including: von Ondarza and Garcia, "Nitrox Debuts in Puerto Rico!" and Rutkowski, Gas Separation Technology?.

Pp. 1, 2, 6 and rear, IANTD Journal, vol. 94–1, Feb.–Apr. 1994 , including: Mount, "Presidents Message", Gilliam, There He goes Again . . . , and Rutkowski, Is Nitrox 'Oxygen Enriched Air'or 'Denitrogenated Air'.

Pp. 3 and 12, IANTD Journal, vol. 94–2, Rutkowski, "History of Gas Blending and Separation Technology".

Exair Corporation, "Case Histories –Vortex Tube", pp. 7–10.

Exair Corporation, Cabinet Coolers, pp. 11–17.

"Alternative Methods of Cooling and Dehumidifying Hyperbaric Systems" Linda Moroz et al., NOAA Experimental Diving Unit Report 93–05, MTS '93 Conference Proceedings, Long Beach, CA, Sep. 22–24, 1993.

"Nitrox Diving Within NOAA: History, Applications and Future", J. Morgan Wells et al., Workshop on Enriched Air Nitrox Diving, Sep. 1989, pp. 31–41.

Copies of pp. 1–13, Plaintiff's Response to Defendant's Requests for Admissions with Exhibits A, B, C and D, and pp. 1–3, Plaintiff's Response to Defendant's Second Set of Requests for Admissions with Exhibits A, B and C, Civil Action No. 97 C 2014, decided Nov. 20, 1997.

Copies of pp. 1–13, Plaintiff's Response to Defendant's First Set of Interrogatories, Civil Action No. 97 C 2014, decided Nov. 20, 1997.

"Turning up the Pressure in the Gas Blending Wars", Aqua CORPS Journal 13, n.d., p. 83.

Brochure, PRISM Separators "Nitrogen Generators", pp. 1–8, Monsanto Company, 1985.
Brochure, PRISM "Nitrogen Systems", pp. 1–8, Permea, Inc., 1987.
Brochure, "PRISM Controlled Atmosphere Systems", Permea, Inc., 1987, pp.1–4.
Brochure, Permea Offshore Nitrogen Systems, Permea Maritime Protection, 1992, pp. 1–4.
Brochure, Permea Shipboard Gas Generation Systems, Permea A/S –Maritime Protection, 1990, pp. 1–8.
Brochure, "Advanced PRISM Membrane Systems for Cost Effective Gas Separations", n.d.
"Medal Gas–separation Membranes", Medal, Newport, DE, Jul. 1992, pp. 1–6.
Brochure "AVIR Oxygen Enrichment Systems," A/G Technology Corporation, Needham, MA, Aug. 1989, 2 pp.
Brochure, "AG Series Gas Boosters Rapid Reference Performance Data", Hasbel Inc., Burbank, CA, Jun. 1986.
U.S. Navy Diving Manual, Chapter Two, Underwater Physics, pp. 2–1–2–28, n.d.
Permea 2–pages document, "How Membranes Work", 1992.
Medal 4241 Permeator Preliminary Product Specifications, 1 p.

Air Liquide M500 Operating Instructions, 9 pp., Sep. 21, 1994, w/attachment, MEDAL Rev. 2.0, Jul. 1992.

Copies of pp. 1–2, Judgment, and pp. 1–72, Memorandum Opinion and Order, Civil Action No. 97 C 2014, U.S. Distict Court for the Northern District of Illinois, Eastern Division, decided Nov. 20, 1997.

MEDAL M500 Series N2 Generator, Piping and Instrumentation Diagram, Feb. 1994.

Copies of pp. 142, 164–175 and 230, 233–234 from Transcripts of Proceedings –Trial Before the Hon. Morton Denlow, Magistrate Judge, Civil Action No. 97 C 2014, U.S. District Court, Northern District of Illinois, decided Nov. 20, 1997.

Miscellaneous Permea product labels and schematic diagram.

Condensed Transcript and Index of Deposition of Gregory L. Malcolm, Civil Action No. 97 C 2014, Jun. 2, 1997, pp. 65–72.

METHOD AND APPARATUS FOR SUPPLYING A PRESSURIZED DIVER'S BREATHING GAS FOR UNDERWATER DIVERS

This application is a continuation-in-part of U.S. patent application Ser. No. 08/518,020, filed Aug. 22, 1995, now U.S. Pat. No. 5,611,845.

BACKGROUND OF THE INVENTION

1. Field of the Invention

The present invention relates to a novel method and apparatus for life support systems for supplying a pressurized diver's breathing gas for underwater divers and, more particularly, to a subassembly equipment package useable by dive shops, remote sites, diver boats, live aboards and the like for incorporation into the novel apparatus of the present invention whereby an advantageous life support system for supplying diver's breathing gas can be readily produced.

2. Description of Related Art

Techniques for producing a mixture of oxygen enriched air, known in the art as $EAN_x$ (enriched air nitrox), have been known for many years, as well as the advantages of using such enriched air as a diver's breathing gas. However, the life support systems for producing same have utilized the concept of enriching air by adding pure oxygen to it. Such a system is disclosed by U.S. Pat. No. 4,860,803 to Wells, which shows oxygen injected into a stream of ambient air in order to produce an oxygen enriched air mixture. The mixture is compressed and delivered to storage or scuba cylinders for use in diving or other applications. A source of oxygen appropriate for injection into the ambient air stream is needed in this known system and, consequently, not only is a great deal of caution required during generation of the oxygen enriched air mixture to avoid explosions and other problems typically associated with the use of oxygen, but, even more important, such systems require oxygen cleaning which is a drawback.

SUMMARY OF THE INVENTION

Accordingly, it is a principal object of the present invention to provide a method and apparatus for life support systems for supplying or producing a diver's breathing gas, $DNA_x$, that avoids the problems and drawbacks of the prior art and functions in a more efficacious and versatile manner.

It is a further object of this invention to provide an improved life support system for enhancing the oxygen content of air to generate a pressurized enhanced oxygen air mixture suitable for a diver's breathing purposes, which does not require the use of oxygen supplied from a separate oxygen source. The $DNA_x$ (Denitrogenated Air Nitrox) is produced by an enhancement technique as opposed to an enrichment technique.

It is another object of this invention to provide such a life support system in a convenient equipment package which is easily transportable and can be installed together with other on-site equipment to create the apparatus and method of the present invention in a dive shop, diver's boat, remote site and other such locations.

According to the present invention, these and other objects are accomplished by the provision of a unique equipment package that includes a special permeable membrane gas separation system, such as the one supplied by PERMEA, INC. of St. Louis, Mo. and sold under the trade name PRISM Membrane System. The PERMEA, INC. PRISM Alpha Membrane System uses thousands of membrane fibers each having an axially through lumen that are bundled into and appropriately sealed in a cylinder. Air is introduced axially into one end of the cylinder and oxygen and a portion of the nitrogen permeate through the fibers and are drawn off through a radial outlet that communicates with the annular space surrounding the fibers. Nitrogen passes axially through the fibers and is discharged axially at the other end of the cylinder. This membrane system is disclosed in U.S. Pat. No. 4,894,068 which is incorporated herein by reference. Other similar membrane systems using bundles of hollow fibers are shown, e.g., in U.S. Pat. No. 5,226,931.

The package also includes an entry conduit for higher pressure air provided with an on-off valve that leads to a thermostatically controlled heat exchanger via a pressure regulator that expands the air with cooling to a lower pressure, i.e., a corresponding drop in temperature and pressure. The discharge of the lower pressure, temperature controlled air of the heat exchanger is passed through a carbon filter, and into one end of the membrane gas separation system cylinder. As noted, nitrogen is discharged from the other end of the cylinder and the discharge is controlled by a manually or automatically controllable needle valve.

The enhanced oxygen air ($DNA_x$), sometimes referred to herein simply as Nitrox, is discharged radially from the cylinder through a low pressure conduit and monitored by a low pressure oxygen analyzer. This equipment package is connected at the utilization site with a high pressure compressor driven by a suitable prime mover via an overpressure valve set at a predetermined value above the design pressure in the low pressure conduit. The high pressure Nitrox ($DNA_x$) is filtered in a known CGA Grade E filtration system. The output of the filtration system is distributed by appropriate valving to either a high pressure compressed $DNA_x$ storage cylinder or to a fill station provided with a pressure gauge and a high pressure oxygen analyzer. Also, a high pressure compressed air storage cylinder serving as a supply to the equipment package is, by appropriate valving, also available to the fill station.

As noted, the package includes a pressure regulator for reducing a feed air pressure of from 175–6000 p.s.i.g. to a pressure in a range of 50–400 p.s.i.g. Depending upon the characteristics of the gas separation membrane system, the heat exchanger will adjust the feed air temperature to the design temperature of the membrane by either heating or cooling the feed air after reduction of the high pressure feed air to a low pressure. This pressure reduction selectively produces a cooling effect. The oxygen content of the $DNA_x$ discharged from the package is controllable by adjusting the reduced pressure or temperature of the feed air into the gas separation membrane system. The preferred way, however, is to adjust the rate of discharge of the nitrogen from the membrane system, and, to this end, an adjustable valve, preferably a needle valve, is placed in the nitrogen discharge line. Manipulation of the needle valve controls the nitrogen discharge flow rate, which, in turn, controls the oxygen concentration of the enhanced oxygen air, ($DNA_x$), passing from the package. The nitrogen flow rate is directly proportional to the oxygen content, i.e., a greater flow rate produces a greater oxygen content at the $DNA_x$ outlet.

In other systems according to the invention, the feed air to the pressure regulator can be obtained from a low pressure compressor, optionally via a volume tank. In this case, the output of the low pressure compressor is feed air at 50–175 p.s.i.g. Also, the $DNA_x$ discharging from the gas membrane separation system can be fed, via a suitable overpressure (relief) valve to a low pressure compressor and then to a $DNA_x$ storage or volume tank via filters. The output from the $DNA_x$ volume tank can be used directly by an underwater working diver with a full face mask connected by a breathing tube and flow control valve to the $DNA_x$ volume tank.

Other and further objects and advantages of the present invention will become more apparent and evident from the following description of a preferred embodiment and best mode when taken in conjunction with the appended drawings.

DESCRIPTION OF THE PREFERRED EMBODIMENT

Figure 2:
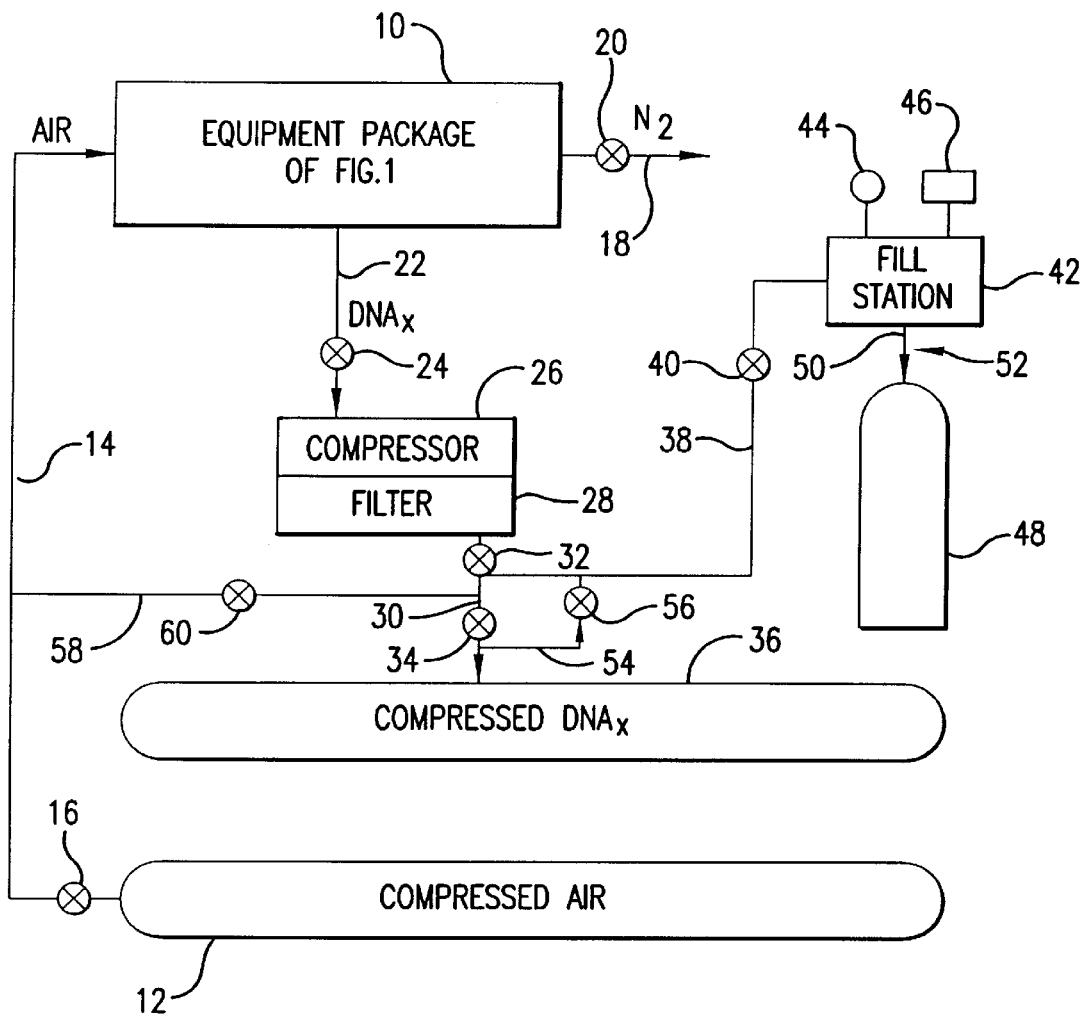
FIG. 2 is a block diagram of a novel embodiment of the method and apparatus according to the present invention.
Figure 3:
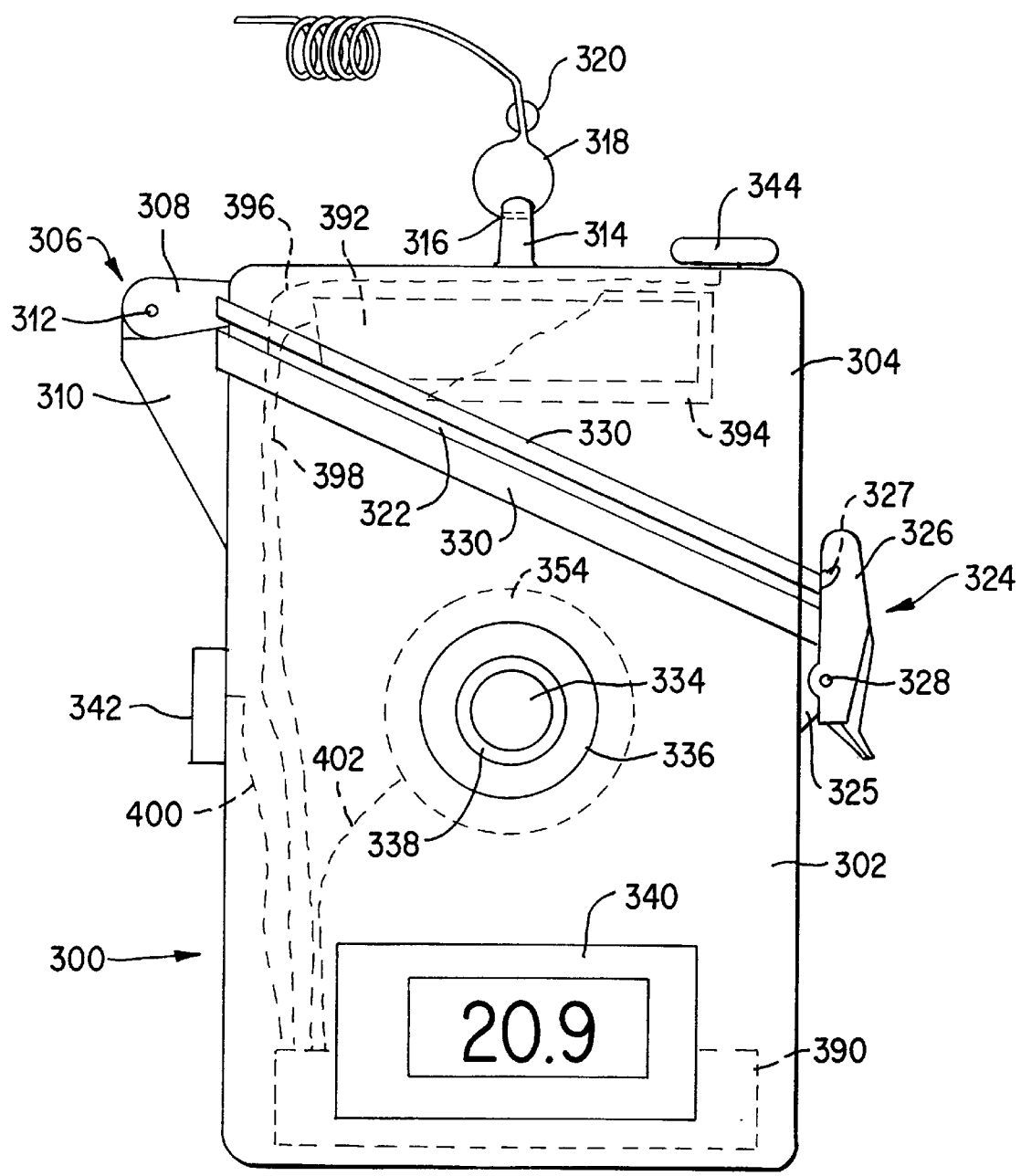
FIG. 3 is a view in side elevation showing a novel oxygen sensor as used in the equipment package of FIG. 1.

Referring initially to FIG. 2, a novel embodiment of the apparatus and method according to the present invention is shown and consists of an equipment package 10 (a subassembly) that receives high pressure, compressed air from compressed air tank 12 via line 14 and valve 16. Nitrogen is discharged or exhausted from package 10 via line 18 and valve 20. Nitrox, enhanced oxygen air ($DNA_x$) is discharged or exhausted from package 10 via line 22 and overpressure valve 24, and is connected to the inlet of a high pressure compressor 26 driven by a suitable prime mover (not shown). The high pressure compressed $DNA_x$ passes through filter 28 and exhausts through line 30 via valves 32 and 34 to a high pressure compressed $DNA_x$ storage cylinder 36. Branch line 38 connects line 30 to a $DNA_x$ fill station 42 via valve 40. Fill station 42 is provided with a high pressure gauge 44 and a high pressure oxygen analyzer 46. Scuba tanks 48 (only one shown) are filled at the fill station 42 via line 50 and control valve 52. High pressure $DNA_x$ from storage cylinder 36 can pass to the fill station via line 30, branch line 54 and valve 56 coupled to branch line 38. Compressed air from cylinder 12 can pass to the fill station 42 via branch line 58 and valve 60, if it is desired to fill tanks with compressed air.

Figure 1:
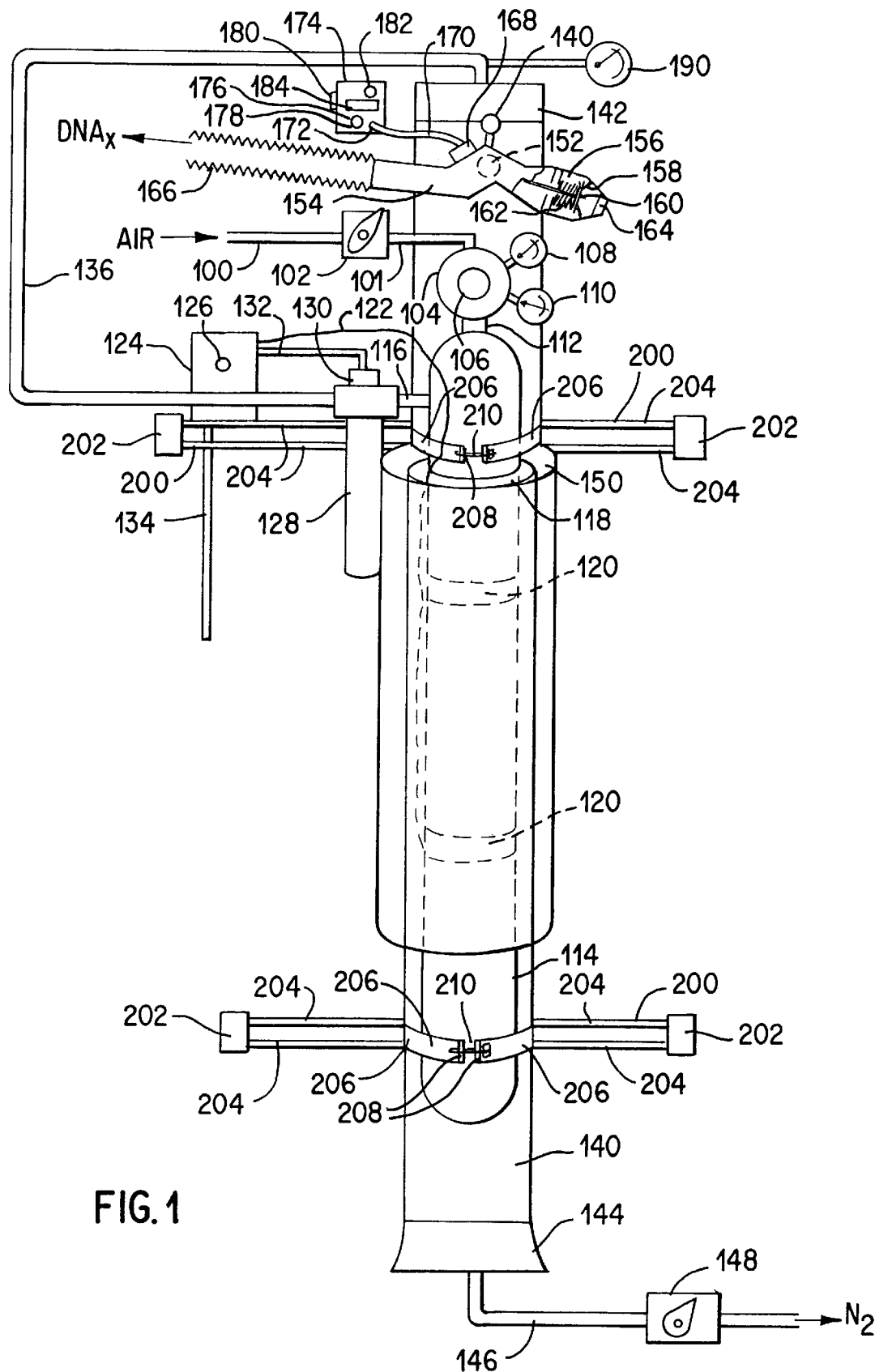
FIG. 1 is a view in side elevation showing the novel subassembly equipment package of the invention.

Reverting now to FIG. 1, line 14 from tank 12 couples to package 10 via line 100, which may be simply a continuation of line 14. An on-off valve 102 is coupled to line 100 to control the flow rate.

The high pressure feed air from tank 12 supplied through the air inlet line 100 is at a pressure of from 175–6000 p.s.i.g. but preferably from 1000 to 4500 p.s.i.g. Line 101 connects valve 102 to a pressure regulator 104 controlled, by operation of a rotatable knob 106, to adjust or reduce the pressure of the high pressure feed air supplied through the inlet line 100 to a low pressure of from about 50 to about 400 p.s.i.g., but preferably from 100–300 p.s.i.g. which is the preferred range. A first gauge 108 provides a high pressure inlet reading, in p.s.i.g., and a second gauge 110 provides a reduced pressure reading for the low pressure feed air exiting the pressure regulator. The reduction in pressure through valve 104 selectively produces a cooling of the low pressure feed air depending upon the selected pressure drop.

Low pressure cooled feed air exits the pressure regulator 104 and is introduced via tube 112 axially into an elongated copper tube 114 about 2–2½ inches in diameter serving as a heat exchanger. The low pressure air passes axially down the tube 114 which is appropriately baffled to first lead the air down and then up to a radial discharge port near the top of tube 114, which port is connected with line 116. Tube 114 is jacketed with insulation 118 throughout most of its length (about 95%) and is provided with resistance heating bands 120 axially spaced on tube 114. A pair of wires 122 carry electricity to bands 120 from a manually controllable thermostat 124, controlled by knob 126. An electric power cord 134 supplies power via thermostat 124 to the resistance heating bands 120. Alternatively, the heating of the air can be effected by a resistance coil positioned axially in tube 114 with wires 122 connected through the wall of tube 114 in an insulated and gas tight manner. The air is heated to from about 80° F. to about 150° F. and preferably in the range of from about 90° F. to about 125°.

Low pressure air is discharged from tube 114 through line 116 which connects into a carbon filter 128 designed to remove hydrocarbons. A thermocouple 130 is mounted on filter 128 and is exposed to the air passing therethrough. The output of thermocouple 130, which senses the air temperature, is connected to the thermostat 124, via leads 132. The heated low pressure air exhausting or discharging from filter 128 is led by line 136 to the top of a gas separation membrane system in the form of an elongated plastic (PVC) tube 140 having aluminum end caps 142, 144 at its ends.

The gas separation membrane system shown in FIG. 1 consists of a bundle of hollow fibers contained in the tube 140 and this system is sold by Permea, Inc. under the trade name PRISM Alpha Membrane Separator. The fibers are sealed together at their ends and sealed in the tube 140 spaced slightly from caps 142, 144. Entry into the tube 140 of low pressure heated air is axially at one end with discharge of nitrogen being axially at the other end. Since oxygen migrates through the walls of the hollow fibers faster than nitrogen, the oxygen and some nitrogen is collected in the annular space surrounding the hollow fibers. The nitrogen that traverses the hollow fibers collects at the other end. Nitrogen, containing less than about four percent oxygen, passes out of tube 140 through line 146 having a manually or automatically adjustable needle valve 148 interposed therein to control the flow rate. The nitrogen exhausting from line 146 is a waste gas and couples with line 18 of FIG. 2 to lead the nitrogen to a location where it can be dispersed in the ambient without danger to life due to suffocation or oxygen deprivation.

Tube 140 is jacketed with insulation 150 extending coextensive with jacket 118 of tube 114. A temperature gauge 190 is tapped into line 136 where it connects into the center of cap 142 to provide a visual reading of the temperature of the low pressure heated air as it enters the gas separation membrane system.

The $DNA_x$ that collects in the annular space in tube 140 is withdrawn through radial port 152 defined or formed in the wall of tube 140 and passes into a plastic tube 154, one end of which contains an enlarged cross section 156 within which is mounted a one-way check valve consisting of valve seat 158, stemmed valve element 160 and a spring 162 biasing the element 160 against seat 158 with a force of about 1–3 p.s.i, but preferably 0.5 p.s.i. The end of tube 154 is closed by a porous resilient filter 164, such as plastic foam, to filter ambient air entering tube 154 against the force of the one-way check valve. The other end of the tube 154 is connected to corrugated tube 166 which couples to or is simply a continuation of line 22 of FIG. 2. A nipple or projection 168 containing a monitoring orifice is mounted on the tube 154 adjacent to radial port 152, on its downstream side, that is, toward tube 166. The orifice is exposed to the interior of tube 154 and, therefore, a small quantity of $DNA_x$ will flow through the orifice. A tube 170 friction fits into projection 168 and couples the downstream side of the orifice and projection 168 to the inlet 172 of a low pressure, temperature compensated, oxygen sensor 174. Sensor 174 consists of a housing into which a fitting 176 is received in a gas tight fashion which is coupled to tube 170 and provides an exhaust port 178. Also, mounted on the housing of sensor 174 is an on-off contact switch 180, a digital display 184, a calibration knob 182 to "zero" or set the digital display 184 to ambient $O_2$ conditions, and, within the sensor 174, an oxygen sensor, a battery, appropriate electronics, as known, and leads connecting all components.

A pair of rails 200 are provided for mounting the components of the package. Rails 200 are U shaped channel sections of extruded aluminum having plastic end caps 202. The open mouth of the rails 200 faces horizontally and is slightly closed or narrowed by inwardly directed flanges 204. Clamps, in the form of bent bars 206 of aluminum, are notched to be received in rails 200 and engaged with flanges 204 and extend around tubes 140 and 114, defining bent flanges 208 that are coupled by nut and bolt assemblies 210. Thermostat 124 is attached to the top of top rail 200 as viewed in FIG. 1 by a conventional attachment. Tube 146 can be brought to either rail with needle valve 148 being clamped to the rail by a conventional clamping means. Tube 170 is received in projection 168 in a friction fit that provides a substantially gas tight coupling while being removable from projection 168 simply by pulling out. Tube 170 can be reinserted into projection 168 simply by pushing in. The reason for this is that the oxygen sensor 174 is delicate and needs to be handled separately from the remainder of the package when it is being moved about, such as when installed. In the manner described, sensor 174 and tube 170 can be readily decoupled.

The high pressure compressed air in tank 12 is at a pressure of from about 175–1000 as a minimum to about 6000 p.s.i.g. and preferably from about 1000 to about 4500 p.s.i.g. Regulator valve 104 regulates the feed air from high pressure of tank 12 by expanding the high pressure compressed air and dropping the pressure into the low pressure range of from about 50 to about 400 p.s.i.g., and, preferably, from about 100 to about 300 p.s.i.g. When the high pressure is dropped to the low pressure, considerable cooling is effected. Heater 114 adjusts the temperature of the low pressure air to from about 90° F. to about 125° F. This combination of pressure and temperature optimizes the efficiency of the Permea Gas Separation Membrane System, which is the preferred membrane system. The pressure of the $DNA_x$ exiting the port 152 is from about 0.5 to 5 p.s.i.g., the preferred range is from about 1 to about 2.5 p.s.i.g., and the best operating condition is from 1 to 2 p.s.i.g. The monitoring orifice in projection 168 meters the $DNA_x$ at the rate of from about 0.25 liters per minute to about 0.5 liters per minute when the pressure at the exit port 152 is from about 1 to about 2 p.s.i.g. and, to insure control, a pressure gauge 240 is tapped into tube 154 in the immediate vicinity of port 152. The pressure, temperature and other operating conditions including flow rate of the package are adjustably controlled to achieve the exit pressure at port 152 of from about 1 to about 2 p.s.i.g.

The one-way check valve in tube 154 serves as a safety for the compressor 26 when the package is connected into the system of FIG. 2. The valve element 160 is biased by spring 162 to open at 0.5 p.s.i.g. to admit ambient air when a negative pressure is in tube 154. Filter 164 is a porous resilient plastic foam mass and serves to keep out dust, dirt and other foreign matter. When compressor 26 is started and insufficient $DNA_x$ is exhausting through port 152, and when the pressure in tube 154 is less than ambient by 0.5 p.s.i.g. or more, the one-way check valve will open and admit ambient air to insure a proper compressor loading. The one-way check valve will close when the $DNA_x$ pressure in tube 154 is equal to or greater than ambient pressure (atmospheric).

The output pressure of the compressor 26 is from about 600 p.s.i.g. to about 4500 p.s.i.g. but could be higher depending on the rating of the tank 36 and scuba tank 48. Also, overpressure valve 24 is set at 0.5–4 p.s.i. above the pressure of the $DNA_x$ in line 22 which is the same as exiting port 152. The heat setting for valve 24 is 2.8 p.s.i. The enhanced oxygen content of the $DNA_x$ exiting through port 152 is adjustably controlled by changing the operating conditions of the package, i.e., by controlling pressure, temperature and flow rate. The best mode contemplated for controlling oxygen content of the $DNA_x$ is to manually adjust the exhaust flow rate of the nitrogen in line 146 by manually and selectively adjusting the position of needle valve 148 while visually monitoring the digital display of oxygen sensor 174. There is a slight time delay in the procedure, so adjustment of the needle valve 148 needs to be effected stepwise with small delays to allow the system to equilibrate, i.e., come to equilibrium. The preferred oxygen concentrations in the $DNA_x$ are 32%, 36% and 40% although others may be selected.

Referring now to FIGS. 3 and 4, a novel low pressure, temperature compensated, oxygen sensor 300 is shown. This sensor is used for sensor 174 in the equipment package of FIG. 1. As shown, sensor 300 is a box-like structure or housing consisting of a bottom part 302 and a top part 304 joined together by hinge member 306 consisting of a pair of spaced ears 308 attached to top part 304, a projection 310 attached to the bottom part 302 which fits between the ears 308 and a hinge pin 312 holding the ears 308 and projection 310 together in a relatively rotatable relationship. The joint 322 between the bottom and top parts is on an oblique line extending downwardly from the hinge member 306. A projection 314 in the form of an ear is attached to the top surface of top part 304 and an endless cord 318 is looped through hole 316 formed in projection 314. Bead 320 is slidably carried by the cord 318 to adjust the loop in contact with ear 314.

A clamp member 324, consisting of mutually engaging hook elements, the outer one 326 of which is pivoted to a support plate 325 mounted on bottom part 302 by a pivot pin 328, and the inner one being a hook 327 formed on top part 304, serves to effect closure of top part 304 to bottom part 302. The joint between the top and bottom parts 304, 302 is flanged or thickened as indicated by reference numeral 330 and one flange is provided with an endless groove or depression for receiving a gasket or sealing ring. When the parts are pivotally brought together and clamped by clamp member 324, the gasket is compressed and a substantially liquid tight seal is effected.

A bore 334 is formed through the front wall of bottom part 302 with an annular plug 336 fitted and sealed into bore 334 and having a slightly elevated inner annular rim 338 immediately surrounding the bore 334. A digital display 340, e.g., an LED, is located on the front wall or face of the bottom part 302 below plug 336. A contact on-off switch 342 slightly projects from the side wall of bottom part 302 opposite clamp member 324. A rotatably mounted calibration knob 344 is mounted on the top wall of top part 304.

Figure 4:
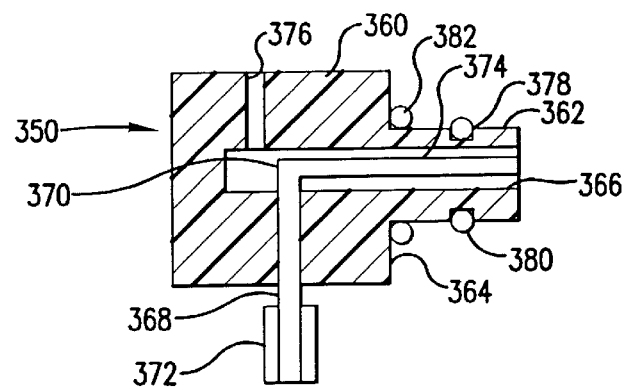
FIG. 4 is a view in axial section of a fitting used with the oxygen sensor of FIG. 3.
Figure 5:
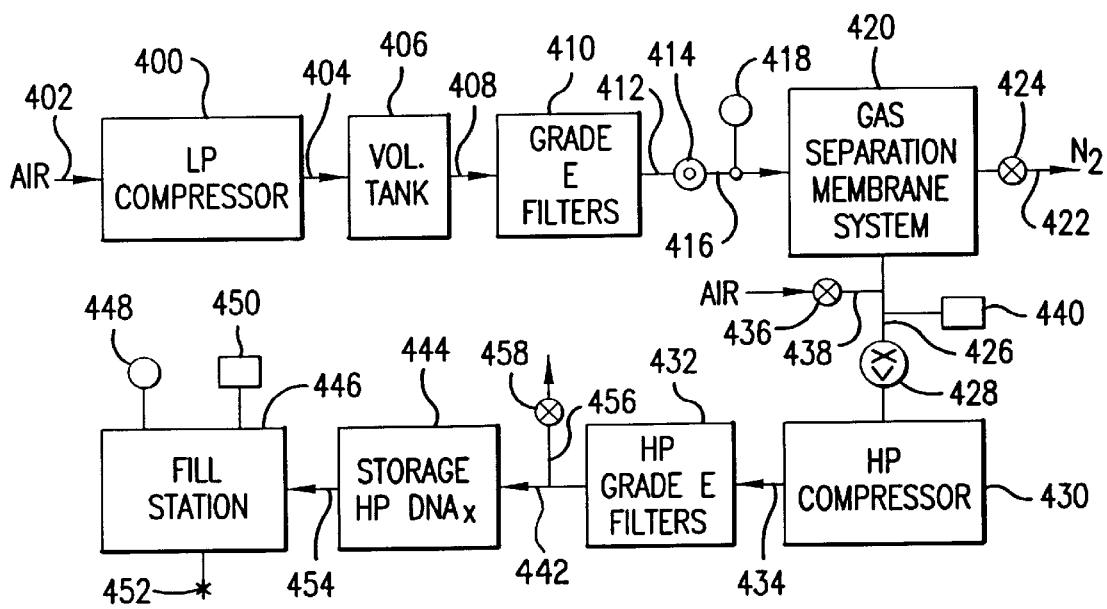
FIG. 5 is a block diagram showing another novel embodiment of the method and apparatus according to the present invention.
Figure 6:
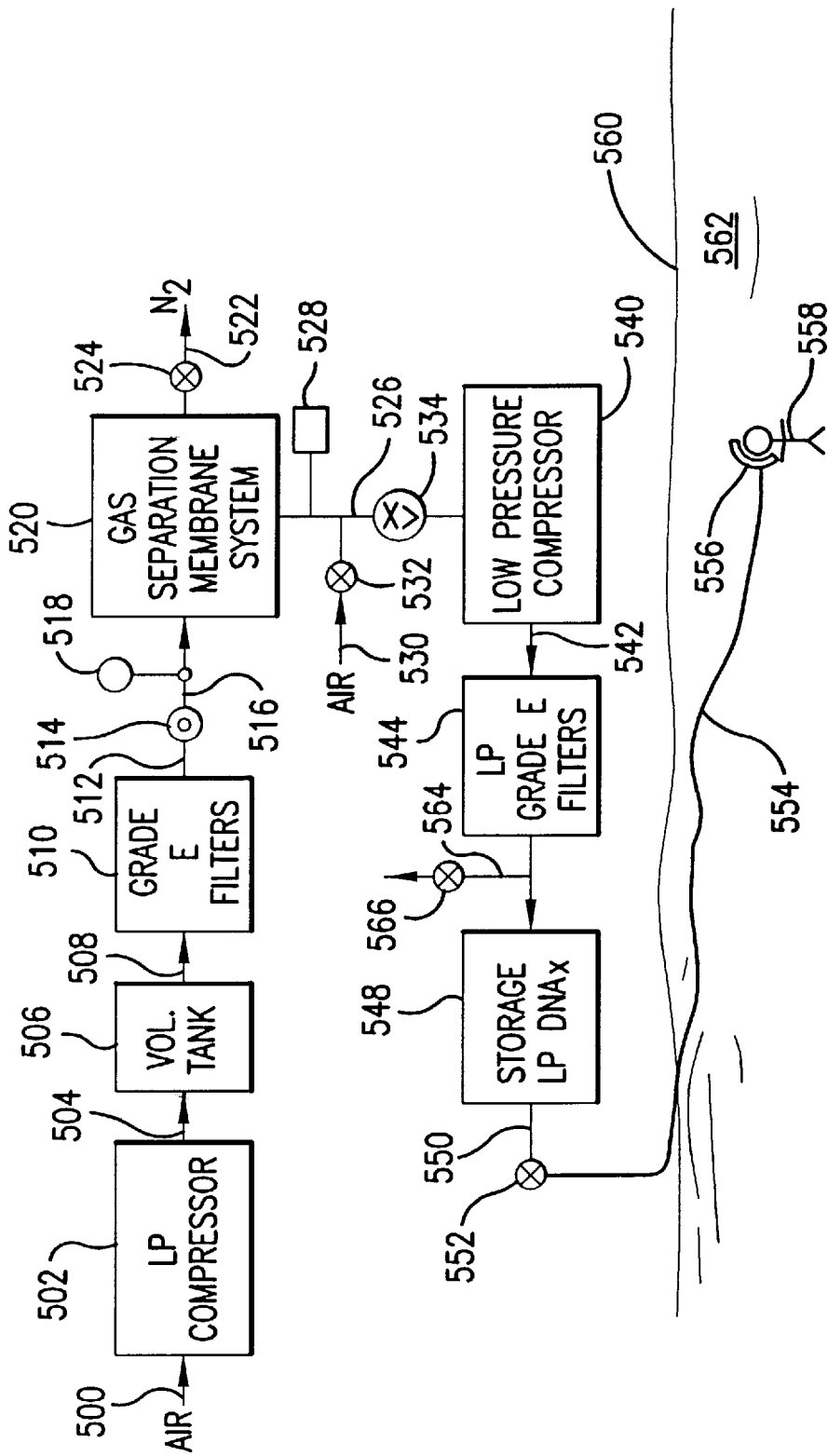
FIG. 6 is a block diagram showing still another novel embodiment of the method and apparatus according to the present invention.

A feed plug 350 is shown in axial section in FIG. 4, which is received in the bore 334. The function of feed plug 350 is to connect with line 170 of FIG. 1 and to bring the metered $DNA_x$ into the bore 334 where it is contacted with the oxygen sensor 354 mounted in bottom part 302 on the inside of the wall surrounding the bore 334 in a gas tight manner. Plug 350 consists of an outer cylinder 360 of plastic and an integral inner cylinder 362 of plastic having a reduced section so that the cylinders define between them a shoulder 364. An axial bore 366 extends from the free end of cylinder 362 back into cylinder 360 and terminates spaced from the free end of cylinder 360. A metal tube 368 is radially received in cylinder 360 and extends into bore 366 where it is bent 90° at 370 to then be directed axially through the bore to terminate at the free end of cylinder 362. A plastic sleeve 372 is fitted over the radially projecting end of tube 368 to facilitate coupling to tube 170. An annular space 374 is defined between the axial extension of tube 368 and the wall of bore 366. A radial bore 376 in cylinder 360 communicates space 374 with the ambient. The outer peripheral surface of cylinder 362 substantially midway between shoulder 364 and the free end of cylinder 362 defines a peripheral groove 378 extending in a plane normal to the axis of cylinder 362. An O-ring seal 380 is received in groove 378. A second O-ring seal 382, of smaller diameter, is received on the periphery of cylinder 362 and sits at the junction of shoulder 364.

The plug 350 is received in the bore 334 with cylinder 362 projecting into bore 334 and with the free end of cylinder 362 lying in close proximity with oxygen sensor 354. $DNA_x$ metered into tube 170 passes into metal tube 368 and is exhausted from the other end of tube 368 at the free end of cylinder 362 in close proximity to oxygen sensor 354. $DNA_x$ leaving tube 368 eventually passes back through annular space 374 and bore 376 to be exhausted to the ambient. Cylinder 362 force fits into bore 334 and O-ring 380 bears against the wall of annular plug 336 defining bore 334 to effect a gas tight seal. O-ring 382 bears against raised rim 338 to reinforce the gas tight seal.

The electronics of the oxygen sensor are contained on a board 390 mounted in the lower region of the inside wall of the bottom part 302. A power supply in the form of a battery 392 is wedged on opposite sides by foam plastic pieces 394 into the inside of the top part 304. Electric leads 396, 398, 400 and 402 connect calibration knob 344, battery 392, on-off contact switch 342 and temperature compensated oxygen sensor 354, respectively, to the circuit board 390. The electronics of the circuit board 390 are known in the art.

The life support embodiment shown in FIG. 5 consists of a low pressure compressor 400 receiving ambient air as an inlet via line 402. The output from compressor 400 (from about 50–about 175 p.s.i.g.) is directed by line 404 to volume tank 406, line 408 to grade E filters 410 and by line 412 to pressure regulator valve 414 which reduces the pressure to >50 to <175 p.s.i.g. with some cooling. The cooled expanded feed air passes by line 416 to gas separation membrane system 420 as previously described. A temperature gauge 418 monitors and displays the temperature. The nitrogen discharge from system 420 passes via line 422 in which manually or automatically controllable needle valve 424 is interposed.

The $DNA_x$ discharged from membrane system 420 passes by line 426 through an overpressure valve 428 to a high pressure compressor 430. The output of compressor 430, compressed air at from about 600–4500 or greater p.s.i.g. passes to high pressure, grade E filters 432 via line 434. A low pressure oxygen sensor 440 monitors line 426. Ambient air can be drawn into line 426 through a check valve 436 via line 438 as previously described. The output of filters 432 is fed by line 442 to storage tank 444 for storing high pressure $DNA_x$. A fill station 446 provided with a temperature gauge 448, a high pressure oxygen sensor 450 and a fill valve 452 is connected to tank 444 by line 454. Branch line 456 with on-off valve 458 provides a bypass to tank 444, e.g., if it is desired to go directly to fill station 446 or provide other utilization of the high pressure $DNA_x$.

The life support embodiment of FIG. 6 consists of an ambient air line 500 input to low pressure compressor 502 which outputs via line 504 to volume tank 506, line 508, grade E filters 510 and line 512 to pressure regulator 514. Line 516 with temperature gauge 518 leads to membrane system 520. Nitrogen discharge is via line 522 and needle valve 524. $DNA_x$ discharge is via line 526 which is monitored by low pressure oxygen sensor 528 and into which line 530 connects to allow ambient air to be drawn in via check valve 532. An overpressure valve 534 is interposed in line 526. To this point the components and parameters are the same as described in FIG. 5.

A low pressure compressor 540 receives the output of line 526 and outputs a compressed $DNA_x$ having a pressure from about 50–about 175 p.s.i.g. which passes via line 542 to low pressure grade E filters 544 and line 546 and then to storage tank 548 for low pressure $DNA_x$. Line 550 connects tank 548 through a flow regulator 552 with a flexible breathing tube 554 leading to a full face mask 556 on a diver 558 working or swimming under the surface 560 of a body of water 562. Bypass branch line 564 connects to line 546 and has a control valve 566 interposed therein.

Although the foregoing description has been with reference to a vertical orientation for the equipment package illustrated in FIG. 1, the orientation can be horizontal or at any angle. Also, the gas separation membrane systems of the type used by the method and apparatus of the invention, namely, a bundle of hollow fibers, operate within the temperature ranges stated in the foregoing except in one case. In this case, the operating temperature ranges from about 35° F. to about 50° F. When this membrane system is used in the invention, the heat exchanger of the equipment package will cool or heat as necessary to adjust the low pressure feed air to the appropriate operating temperature for the membrane system.

Although the invention has been described herein by reference to a preferred embodiment, nevertheless, changes and modifications are possible as will be evident to those skilled in this art. Such changes and modifications which do not depart from the spirit, scope and teachings are deemed to fall within the purview of the appended claims.

I claim:

1. A process for supplying enhanced oxygen air for use by divers as a life support system comprising the steps of:

(a) providing a supply of pressurized feed air;

(b) reducing the pressure of said pressurized feed air, with cooling, to 50–400 p.s.i.g.;

(c) modifying the temperature of the reduced pressure feed air to a preselected value resulting in temperature modified, reduced pressure feed air;

(d) separating nitrogen from said temperature modified, reduced pressure feed air by a permeable membrane gas separation system using a bundle of hollow fibers resulting in enhanced oxygen air;

(e) discharging the nitrogen from the separation system;

(f) discharging the enhanced oxygen air from the separation system;

(g) controlling the oxygen content of the discharged enhanced oxygen air by varying the flow rate of the nitrogen discharge;

(h) compressing the discharged enhanced oxygen air to a preselected pressure; and (i) storing the compressed enhanced oxygen air as breathable air useable underwater.

2. A process as defined by claim 1, wherein said preselected temperature value is in one of a range of from about 35° F. to about 50° F. and a range of from about 80° F. to about 150° F.

3. A process as defined by claim 1, further comprising the step of adjusting the rate at which the nitrogen is discharged in order to modify the oxygen content of said enhanced oxygen air to a preselected value.

4. A process as defined by claim 1, further comprising the step of removing hydrocarbon impurities from said feed air before separating nitrogen from said feed air.

5. A process for supplying enhanced oxygen air for use by divers as a life support system comprising the steps of:

(a) providing a supply of high pressure feed air having a pressure in the range of from about 175 to about 6000 p.s.i.g.;

(b) reducing the pressure of said high pressure feed air, with cooling, to 50–400 p.s.i.g.;

(c) modifying the temperature of the reduced pressure feed air to a preselected value resulting in temperature modified, reduced pressure feed air;

(d) separating nitrogen from said temperature modified, reduced pressure feed air by a permeable membrane gas separation system using a bundle of hollow fibers resulting in enhanced oxygen air;

(e) discharging the nitrogen at a controllable flow rate;

(f) discharging the enhanced oxygen air from the separation system;

(g) compressing the discharged enhanced oxygen air to a high pressure of from about 600 p.s.i.g. to above 4500 p.s.i.g.; and (h) storing the compressed enhanced oxygen air as breathable air useable underwater.

6. A process as defined by claim 5, wherein said preselected temperature value is in a range of from about 80° F. to about 150° F.

7. A process as defined by claim 5, further comprising the step of adjusting the rate at which the nitrogen is discharged in order to modify the oxygen concentration of said enhanced oxygen air to a preselected value.

8. A process as defined in claim 5 further comprising the step of removing hydrocarbon impurities from said feed air before the nitrogen separation.

9. A process for supplying enhanced oxygen air for use by divers as a life support system comprising the steps of:

(a) providing a supply of pressurized feed air at a pressure of from about 50–175 p.s.i.g.;

(b) reducing the pressure of said pressurized feed air, with cooling, to 50–less than 175 p.s.i.g.;

(c) monitoring the temperature of the reduced pressure feed air;

(d) separating nitrogen from said reduced pressure feed air by a permeable membrane gas separation system using a bundle of hollow fibers resulting in enhanced oxygen air;

(e) discharging the nitrogen at a controllable flow rate;

(f) discharging the enhanced oxygen air from the separation system;

(g) compressing the discharged enhanced oxygen air to a pressure of from about 50 to greater than 4500 p.s.i.g.; and (h) storing the compressed enhanced oxygen air as breathable air useable underwater.

10. A process as defined by claim 9, wherein step (g) compresses said enhanced oxygen air in a range of from about 50 p.s.i.g. to about 175 p.s.i.g.

11. A process as defined by claim 9, wherein step (g) compresses the enhanced oxygen air from about 600 to about 4500 p.s.i.g.

12. A process as defined by claim 9, further comprising the step of adjusting the rate at which the nitrogen is discharged in order to modify the oxygen concentration of said enhanced oxygen air to a preselected value.

13. A process as defined in claim 9, wherein the feed air is filtered before and after step (g).

14. A process for supplying enhanced oxygen air for use by divers as a life support system comprising the steps of:

(a) providing a supply of pressurized feed air;

(b) reducing the pressure of the feed air, with cooling, to 50–400 p.s.i.g.;

(c) monitoring the temperature of the reduced pressure feed air;

(d) separating nitrogen from said temperature modified, reduced pressure feed air by a permeable membrane gas separation system using a bundle of hollow fibers resulting in enhanced oxygen air;

(e) discharging the nitrogen at a controllable flow rate;

(f) discharging the enhanced oxygen air from the separation system;

(g) compressing the discharged enhanced oxygen air to a pressure of from about 50 to about 175 p.s.i.g.; and (h) feeding the compressed enhanced oxygen air as an underwater breathable air life support system to a diver located underwater via a conduit, flow control valve and face mask.

15. A process as defined by claim 14, wherein said feed air is filtered before and after step (g).

16. A process as defined by claim 14, further comprising the step of adjusting the rate at which the nitrogen is discharged in order to modify the oxygen concentration of said enhanced oxygen air to a preselected value.

17. A subassembly package for use in generating enhanced oxygen air, particularly, for underwater use by divers as a life support system comprising:

a pressure regulator for reducing with cooling a pressurized feed air to a lower predetermined value;

a heat exchanger for modifying the cooled reduced pressure feed air to a predetermined temperature;

a hollow fiber permeable membrane gas separation system for separating nitrogen from the modified feed air to thereby enhance the oxygen content of the feed air;

an adjustable valve which varies the discharge rate of the separated nitrogen from the package to vary in response the oxygen content of the enhanced oxygen air;

a discharge member for receiving the discharge of the enhanced oxygen air from the separation system; and a low pressure oxygen sensor for monitoring the oxygen content of the enhanced oxygen air in the discharge member.

18. A package as defined by claim 17, wherein the heat exchanger is electrically heated to heat the feed air temperature to the predetermined temperature.

19. A package as defined by claim 17, wherein the heat exchanger cools the feed air.

20. A package as defined by claim 17, further comprising a one-way check valve connected to said discharge member for introducing ambient air.

21. A package as defined by claim 17, further comprising a thermostat for monitoring the feed air temperature and controlling the heat exchanger.

22. A package as defined by claim 21, wherein the thermostat is manually adjustable for monitoring and adjusting said feed air temperature.

23. A package as defined by claim 17, wherein the oxygen sensor includes a digital display.

24. A package as defined by claim 17, wherein a metering device is provided to meter a portion of the separated enhanced oxygen air to the oxygen sensor.

25. A package as defined by claim 24, wherein said metering device is constructed to meter enhanced oxygen air at a rate of from about 0.25 liters/min. to about 0.5 liters/min.

26. A package as defined by claim 17, wherein the heat exchanger and membrane gas separation system are comounted on a pair of spaced rails.

27. A package as defined by claim 17, wherein the temperature of said feed air is modified to a temperature in one of a range of from about 35° F. to about 50° F. and a range of from about 80° F. to about 150° F.

28. A package as defined in claim 27, wherein said feed air is heated to a temperature of from about 90° F. to about 125° F.

29. A package as defined by claim 17, wherein the separated and discharged enhanced oxygen air is maintained at a pressure of from about 0.5 p.s.i.g. to about 5 p.s.i.g.

30. A package as defined by claim 29, wherein the discharged enhanced oxygen air is maintained at a pressure of from about 1 to about 2 p.s.i.g.

31. A life support system for a diver while underwater comprising the package according to claim 17, combined with a pressure storage tank for compressed air coupled to said package, a pressure storage tank for enhanced oxygen air, a fill station including a high pressure gauge and a high pressure oxygen sensor, a pressure filter, a compressor for receiving enhanced oxygen air from said package and delivering pressurized enhanced oxygen air to the pressure storage tank for enhanced oxygen air via said pressure filter, and valving for selectively controlling the flow in the system.

32. A system as defined in claim 31, wherein a low pressure compressor supplies air to the pressure storage tank for compressed air.

33. A system as defined in claim 31, wherein the compressor is a high pressure compressor having an output from about 600 to above 4500 p.s.i.g.

34. A system as defined in claim 31, wherein the compressor is a low pressure compressor having an output from about 50 to about 175 p.s.i.g.

35. A system as defined in claim 31, wherein a second pressure filter is interposed between the pressure storage tank and said package.

36. A system as defined in claim 31, wherein a fill station including a high pressure gauge and a high pressure oxygen sensor is coupled to the pressure storage tank for enhanced oxygen air.

37. A system as defined in claim 31, wherein a conduit is coupled at one end to the pressure storage tank for enhanced oxygen air, a diver's face mask is coupled to the other end of the conduit, and a flow control is interposed in the conduit.

* * * * *